(12) United States Patent
Yang et al.

(10) Patent No.: US 8,966,243 B2
(45) Date of Patent: Feb. 24, 2015

(54) METHOD AND SYSTEM FOR DATA ENCRYPTION AND DECRYPTION IN DATA TRANSMISSION THROUGH THE WEB

(75) Inventors: Qian Yang, Shenzhen (CN); Heng Xiao, Shenzhen (CN); Tao Yu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 96 days.

(21) Appl. No.: 13/810,347

(22) PCT Filed: Sep. 14, 2011

(86) PCT No.: PCT/CN2011/079634
§ 371 (c)(1),
(2), (4) Date: Jan. 15, 2013

(87) PCT Pub. No.: WO2012/083732
PCT Pub. Date: Jun. 28, 2012

(65) Prior Publication Data
US 2013/0117555 A1    May 9, 2013

(30) Foreign Application Priority Data

Dec. 22, 2010    (CN) .......................... 2010 1 0615134

(51) Int. Cl.
*H04L 29/06* (2006.01)
*H04L 9/28* (2006.01)
(Continued)

(52) U.S. Cl.
CPC .............. *H04L 9/28* (2013.01); *H04L 63/0428* (2013.01); *G06F 21/606* (2013.01); *H04L 63/062* (2013.01); *H04L 63/166* (2013.01); *H04L 2463/041* (2013.01)
USPC ........... 713/151; 713/156; 713/167; 713/171; 713/185; 713/193; 709/203; 709/227; 709/232

(58) Field of Classification Search
None
See application file for complete search history.

(56) References Cited

U.S. PATENT DOCUMENTS 6,978,378 B1 * 12/2005 Koretz .......................... 713/193
2001/0042124 A1 * 11/2001 Barron .......................... 709/227
(Continued)

FOREIGN PATENT DOCUMENTS

| CN | 1505892 A | 6/2004 |
|---|---|---|
| CN | 101127604 A | 2/2008 |

(Continued)

OTHER PUBLICATIONS

The World Intellectual Property Organization (WIPO) International Search Report for PCT/CN2011/079634 Sep. 14, 2011.

*Primary Examiner* — Shin-Hon Chen
(74) *Attorney, Agent, or Firm* — Anova Law Group, PLLC

(57) ABSTRACT

This invention provides a method and system for data encryption and decryption in data transmission through the web. The method includes: a browser sends a cryptographic information acquisition request to a cryptographic information providing equipment; the cryptographic information providing equipment sends cryptographic information back to the browser via an HTTPS channel; the cryptographic information includes a cryptographic algorithm and a cryptographic index; the browser uses the cryptographic algorithm to encrypt the data to be transmitted, and sends the encrypted data and the cryptographic index to the web server via an HTTP channel; the web server obtains the cryptographic algorithm corresponding to the cryptographic index from the cryptographic information providing equipment, then decrypts the encrypted data. Embodiments of the present invention can alleviate the load in the HTTPS channel, and improve the overall performance.

11 Claims, 3 Drawing Sheets

(51) Int. Cl.
*G06F 21/60* (2013.01)
*H04L 9/32* (2006.01)
*G06F 11/30* (2006.01)
*G06F 12/14* (2006.01)

(56) References Cited

U.S. PATENT DOCUMENTS

| | | | |
|---|---|---|---|
| 2002/0023037 A1* | 2/2002 | White, Jr. | 705/37 |
| 2005/0257057 A1* | 11/2005 | Ivanov et al. | 713/171 |
| 2006/0155869 A1* | 7/2006 | Nanduri et al. | 709/232 |
| 2007/0180230 A1* | 8/2007 | Cortez | 713/156 |
| 2008/0072060 A1* | 3/2008 | Cannon et al. | 713/185 |
| 2009/0220080 A1 | 9/2009 | Herne et al. | |
| 2009/0222888 A1 | 9/2009 | Malpani et al. | |
| 2010/0037050 A1* | 2/2010 | Karul | 713/167 |
| 2011/0004556 A1* | 1/2011 | Engelke et al. | 705/64 |
| 2012/0023158 A1* | 1/2012 | Kashyap et al. | 709/203 |

FOREIGN PATENT DOCUMENTS

| | | |
|---|---|---|
| CN | 101304310 A | 11/2008 |
| CN | 101436933 A | 5/2009 |
| WO | 2010120261 A1 | 10/2010 |

* cited by examiner

METHOD AND SYSTEM FOR DATA ENCRYPTION AND DECRYPTION IN DATA TRANSMISSION THROUGH THE WEB

TECHNICAL FIELD

This invention relates to data transmission technologies and, more particularly, to a method and a system for data encryption and decryption in data transmission through the web.

BACKGROUND OF THE INVENTION

In web applications, a user terminal exchanges data to and from a web server based on a browser platform. In general, the data transmission between a browser and a web server uses AJAX technology via an HTTP (Hypertext Transfer Protocol) channel. However, JavaScrip is an interpretive language, so there is no secrecy in algorithms, and it is not convenient to encrypt the data to be transmitted or decrypt the received data, which could lead to a risk of disclosure of the data in transmission.

The data transmission between a browser and a web server can be related to a variety of Internet services and operations, such as IM (instant messaging), online payment, online banking and securities business, etc. Taking the webIM in the IM system as an example, the characteristics of the webIM is that it does not need to download and install the client application, it can use the browser on a PC with a network connection to login to an IMweb server, and then it can access IM server cluster. Unlike a typical client application which can store some user data on a PC, information such as a buddy list, etc., is obtained from the IMweb server on each connection after login to the IMweb server or to the server cluster and transmitted in cleartext via the HTTP channel. It often cannot encrypt the information, such as a buddy list, chat records, etc., so there is the risk of disclosure of information.

In order to improve the security of data transmission, an HTTPS (Hypertext Transfer Protocol over Secure Socket Layer) channel is often used for data transmission between a browser and a web server. The HTTPS channel is established for the purpose of security, or simply to call it a secure version of the HTTP protocol. In other words, it adds the SSL (Secure Socket Layer) into the HTTP. Thus, the foundation of HTTPS security is SSL, and its cryptographic ability completes data encryption and decryption. When a URL (Uniform Resource Locator) begins with "HTTPS:", it means the data should be transmitted through the HTTPS channel. Further, the HTTPS protocol uses a different default port from the HTTP protocol, and has a cryptographic/authentication layer.

The existing methodologies of cryptographic data transmission generally use the HTTPS channel for data transmission all the way. The HTTPS channel encrypts and decrypts the data transmitted between the browser and the web server, so even if the data were intercepted by a capture tool on a gateway or a router during the transmission, it would not result in the disclosure of data because the capture tool cannot figure out useful information without knowing the cryptographic algorithm. FIG. 1 shows the structure of the current cryptographic system for data transmission through the web.

However, data transmission between the browser and the web server via the HTTPS channel has the following drawbacks.

The HTTPS architecture has great influence on the overall system efficiency, and its impact is roughly 10 times as much as that of the HTTP architecture. If all the HTTP architectures are replaced by the HTTPS architectures, the overall performance will be reduced by about 90%. That is, the existing architecture will significantly increase the load of the HTTPS channel and reduce the overall performance.

SUMMARY OF THE INVENTION

The present invention provides a method for data encryption and decryption in data transmission through the web, this method can reduce the load on the HTTPS channel. The method for encryption and decryption in data transmission through the web includes a browser sending a cryptographic information acquisition request to a cryptographic information providing equipment, and the cryptographic information providing equipment sending the cryptographic information to the browser via an HTTPS channel. The cryptographic information includes a cryptographic algorithm and a cryptographic index. The method also includes the browser encrypting data to be transmitted using the cryptographic algorithm and sending the encrypted data and the cryptographic index to a web server via an HTTP channel. Further, the method includes the web server obtaining a corresponding cryptographic algorithm from the cryptographic information providing equipment based on the cryptographic index to decrypt the encrypted data.

The present invention also provides a system for data encryption and decryption in data transmission through the web, and it can reduce the load of the HTTPS channel. The system for data encryption and decryption in data transmission through the web includes a user terminal, a web server, and a cryptographic information providing equipment. The user terminal is based on a browser and is configured to send a cryptographic information acquisition request to the cryptographic information providing equipment. The browser is configured to receive the cryptographic information including a cryptographic algorithm and a cryptographic index sent from the cryptographic information providing equipment, to use the cryptographic algorithm to encrypt the data to be transmitted, and to send the encrypted data to the web server through the HTTP channel. Further, the web server is configured to receive encrypted data and the cryptographic index sent from the browser, to get the cryptographic algorithm from the cryptographic information providing equipment according to the cryptographic index inside the cryptographic information; and to decrypt the encrypted data. The cryptographic information providing equipment is configured to receive the cryptographic information acquisition request sent from the browser, to send the cryptographic information to the browser via the HTTPS channel; and to provide the cryptographic algorithm corresponding to the cryptographic index according to the request from the web server.

The above technical solutions show that, in this invention, a browser requests the cryptographic information from the cryptographic information providing equipment through the more secure HTTPS channel, encrypts the data to be transmitted, and then sends the data to the web server through the HTTP channel. The web server obtains a cryptographic algorithm from the cryptographic information providing equipment, and decrypts the encrypted data. So that by using the cryptographic information providing equipment to provide cryptographic information to the browser and the web server, it is possible to transmit encrypted data between the browser and the web server through the HTTP channel, not the HTTPS channel. This alleviates the loads on the HTTPS channel, and enhances the overall performance.

DETAILED DESCRIPTION OF EMBODIMENTS

In order to make more clear the purposes, the technical solutions, and advantages of the present invention, the followings describe this invention with further details together with embodiments and accompanying drawings.

According to the present invention, a cryptographic information providing equipment is configured. The cryptographic information providing equipment provides required cryptographic information to a browser and a web server for data encryption and decryption, and the HTTP channel is used to transmit encrypted data between a browser and a web server. Thus, it is unnecessary to use the HTTPS channel for data transmission between a browser and a web server for better security. As a result, it not only provides the security for data transmission, but also alleviates the loads on the HTTPS channel, and improves the overall performance.

Figure 1:
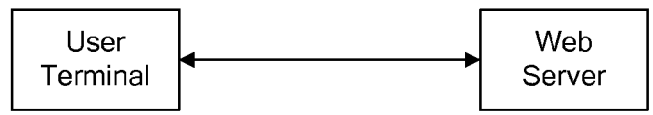
FIG. 1 shows the structure of a current cryptographic system for data transmission through the web.
Figure 2:
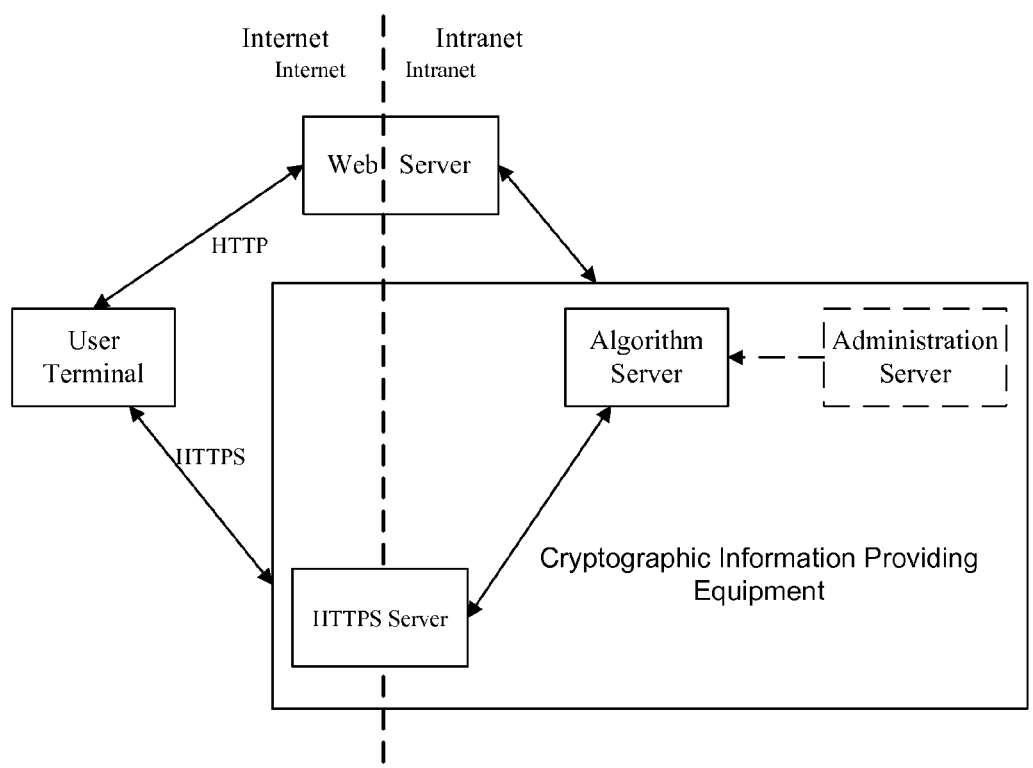
FIG. 2 shows the structure of a cryptographic system for transmitting data through the web in accordance with the present invention.

FIG. 2 illustrates an exemplary structure of a cryptographic system for data transmission through the web, and this system includes a user terminal, a web server, and a cryptographic information providing equipment.

The user terminal, based on a browser, sends a cryptographic information acquisition request to the cryptographic information providing equipment, and receives cryptographic information containing a cryptographic algorithm and a cryptographic index sent from the cryptographic information providing equipment. Further, the browser uses the cryptographic algorithm to encrypt the data to be transmitted, and then sends the encrypted data and cryptographic index to the web server through the HTTP channel.

The web server is used to receive the encrypted data and the cryptographic index sent from the browser, and to decrypt the encrypted data using the corresponding cryptographic algorithm obtained from the cryptographic information providing equipment according to the cryptographic index.

The cryptographic information providing equipment is used to receive the cryptographic information acquisition request sent from the browser, to send the cryptographic information to the browser via the HTTPS channel; and to provide the cryptographic algorithm corresponding to the cryptographic index to the web server according to the request from the web server.

In order to enhance the security, the cryptographic information providing equipment exchanges information with the user terminal through the HTTPS channel. The information transmitted in the HTTPS channel is encrypted, so even if the information was captured by the malicious capture tool, the tool still cannot figure out meaningful information from the intercepted information.

The cryptographic information providing equipment can be implemented by using a dedicated server, or by using an algorithm server and an HTTPS server. In this example, the cryptographic information providing equipment is illustrated by using an algorithm server and an HTTPS server.

The HTTPS server is used to receive the cryptographic information acquisition request sent from the browser, to send the cryptographic information acquisition request to the algorithm server, to receive cryptographic information fed back from the algorithm server, and then to send the cryptographic information to the browser via the HTTPS channel.

The algorithm server is used to receive the cryptographic information acquisition request from the HTTPS server, obtain the corresponding cryptographic information, and send the obtained cryptographic information back to the HTTPS server through an intranet. In order to improve the security, the communications between the algorithm server and the web server, and between the algorithm server and the HTTPS server, are implemented in an intranet.

Optionally, the cryptographic information providing equipment can also include an administration server, which can provide real-time cryptographic information updates to the algorithm server. Specifically, the administration server can replace the cryptographic information, or modify cryptographic algorithms and rules for generating cryptographic keys. The real-time update on the cryptographic information in the algorithm server helps to prevent a malicious outsider from extracting, analyzing, or guessing out cryptographic rules.

Further, in order to improve the security of data transmission from a web server to a browser, the web server and the user terminal may be configured to perform the following operations when the web server transmits data to the browser.

The web server is also used to obtain the cryptographic information including a cryptographic algorithm and a cryptographic index from the cryptographic information providing equipment, to use the cryptographic algorithm in the cryptographic information to encrypt the data to be transmitted, and to send the encrypted data and the cryptographic index in the cryptographic information to the browser through the HTTP channel.

The user terminal, based on a browser, also gets the cryptographic algorithm from the cryptographic information providing equipment according to the cryptographic index sent from the web server through the HTTPS channel.

Figure 3:
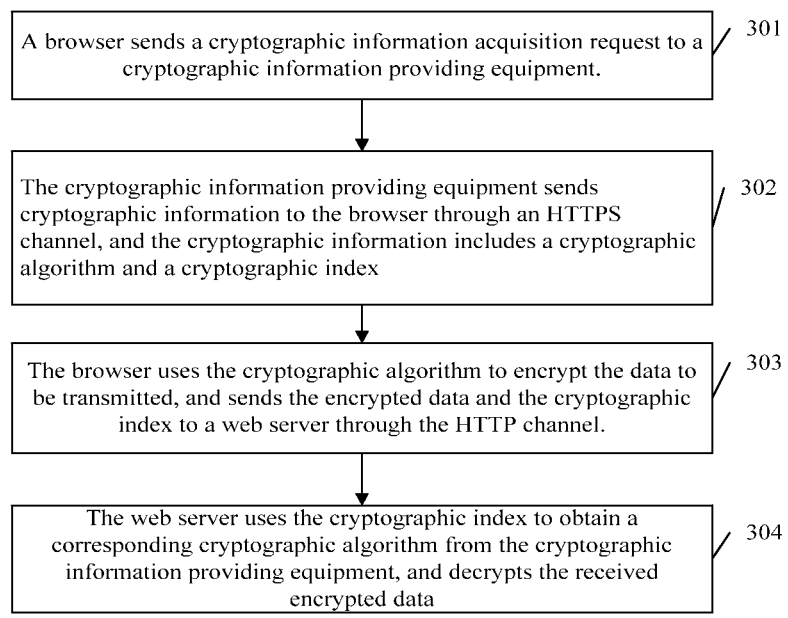
FIG. 3 shows an exemplary flow chart of a process for data encryption and decryption in data transmission through the web in accordance with the present invention.

This invention also provides a method for data encryption and decryption for data transmission through the web. FIG. 3 shows an exemplary flow chart, which includes the following steps.

In step 301, a browser sends a cryptographic information acquisition request to a cryptographic information providing equipment.

In step 302, the cryptographic information providing equipment sends the cryptographic information to the browser through the HTTPS channel; and the cryptographic information includes a cryptographic algorithm and a cryptographic index.

In step 303, the browser uses the cryptographic algorithm to encrypt the data to be transmitted, and sends the encrypted data and the cryptographic index to the web server through the HTTP channel.

In step 304, the web server uses the cryptographic index to obtain the corresponding cryptographic algorithm from the cryptographic information providing equipment, and decrypts the received encrypted data.

To save the storage space of the web server, in this step, the web server can delete the cryptographic algorithm obtained from the algorithm server after it finishes decrypting the encrypted data.

If the cryptographic information providing equipment is implemented by using an algorithm server and an HTTPS server, the cryptographic information providing equipment sending the cryptographic information to the browser in step 302 includes: the HTTPS server within the cryptographic information providing equipment receives the cryptographic information acquisition request, then sends the cryptographic information acquisition request to the algorithm server in the cryptographic information providing equipment. The algorithm server obtains the corresponding cryptographic information, and sends the information to the HTTPS server via the intranet, and the HTTPS server sends the cryptographic information to the browser via the HTTPS channel. Accordingly, the web server obtaining the cryptographic algorithm from the cryptographic information providing equipment according to the cryptographic index in step 304 includes: the web server obtains the corresponding cryptographic algorithm from the algorithm server according to the cryptographic index through the intranet.

The cryptographic information providing equipment stores cryptographic algorithms and corresponding cryptographic indexes. The cryptographic algorithms may include, for example, cryptographic functions and cryptographic keys. After receiving the cryptographic information acquisition request, the cryptographic information providing equipment can randomly select a set of cryptographic information from the storage and provide it to the requesting party. The cryptographic information providing equipment can also choose the cryptographic information based on a set of rules. For example, if the cryptographic information providing equipment stores cryptographic algorithms and corresponding cryptographic indexes according to domain names, the cryptographic information acquisition request received by the cryptographic information providing equipment may also include the domain name information, and the cryptographic information providing equipment may select the corresponding cryptographic information according to the domain name information.

Optionally, the above encryption and decryption flow can also include: performing real-time updates to the cryptographic information stored in the algorithm server.

Further, to improve security of the data transmission from a web server to a browser, embodiments of the invention also include encrypting the data transmitted from the web server to the browser, and specifically the following steps.

The web server sends a cryptographic information acquisition request to the cryptographic information providing equipment.

The cryptographic information providing equipment obtains the cryptographic information containing a cryptographic algorithm and a cryptographic index, and sends the cryptographic information to the web server.

The web server uses the cryptographic algorithm in the cryptographic information to encrypt the data to be transmitted, and then sends the encrypted data and the cryptographic index in the cryptographic information to the browser through the HTTP channel.

Through the HTTPS channel, the browser obtains the cryptographic algorithm corresponding to the cryptographic index sent by the web server from the cryptographic information providing equipment, and then decrypts the encrypted data sent from the web server.

The data transmission between the browser and the web server relates to a variety of Internet services and operations, such as IM, online payment service, online banking and securities system, etc. Taking IMweb as one of the IM systems as an example, the followings illustrate the method for data encryption and decryption in data transmission through the web with detail. This method is implemented by the system shown in FIG. 3, in which the web server is the IMweb server, the cryptographic information providing equipment includes an algorithm server and an HTTPS server. The method may include following steps.

In step 401, a browser sends a cryptographic information acquisition request to an HTTPS server.

In an instant messaging process, if the browser needs to send data to the IMweb server, it executes step 401.

Based on the browser platform on the user's personal computer (PC), the entire JavaScript can be downloaded from a static page server of the IMweb server. Further, the browser uses the JavaScript to launch a cryptographic information acquisition request to the HTTPS server.

In step 402, the HTTPS server receives the cryptographic information acquisition request, and sends the cryptographic information acquisition request to the algorithm server.

In step 403, the algorithm server obtains the corresponding cryptographic information; and sends it to the HTTPS server via an intranet. The HTTPS server sends the cryptographic information to the browser via the HTTPS channel.

The cryptographic information includes a cryptographic algorithm and a cryptographic index. In this embodiment, the cryptographic algorithm includes cryptographic functions and a cryptographic key.

The algorithm server is responsible for maintaining a number of cryptographic function pairs (Fun), each cryptographic function pair including an encryption function (EnFun) and a decryption function (DeFun), and for generating cryptographic keys (Key). Further, all the Fun and Key are combined into lists and an index is set for each list. When Fun and Key are combined, Fun and Key can be a one-to-one combination, or a cross combination, table 1 shows an information list after combination.

TABLE 1

The information list after Fun and Key are combined

| Index | Encryption Function (EnFun) | Decryption Function (DeFun) | Cryptographic Key | Flag |
|---|---|---|---|---|

The index is used to look up the corresponding functions, EnFun is used to encrypt the data to be transmitted, and DeFun is used to decrypt the encrypted data.

Both EnFun and DeFun may use the more efficient symmetric cryptographic algorithm, or an algorithm that can be set by the administrator. The cryptographic keys Key can be generated in large quantity, without repetition, and irreversibly. The Flag can be used to mark whether the algorithm has been used, or has expired, etc. If the user logs in or logs out from WebIM, the WebIM server will notify the algorithm server to update the Flag in the information list in time to change its indicator to not-in-use.

A browser can also store the acquired cryptographic algorithm corresponding to the cryptographic index for multiple uses. So the browser does not need to ask for the cryptographic information from the HTTPS server each time it needs to send data, which simplifies the process.

In step 404, the browser uses the received cryptographic function (EnFun) and cryptographic key (Key) to encrypt the data to be transmitted, then sends the encrypted data and the received cryptographic index to the IMweb server through the HTTP channel.

The browser uses the JavaScript to perform encryption on the data to be transmitted using the cryptographic function and the cryptographic key.

In step 405, according to the cryptographic index, the IMweb server acquires the corresponding cryptographic algorithm from the algorithm server, and then decrypts the received encrypted data.

After the IMweb server obtains the cryptographic algorithm, it can store the cryptographic algorithm corresponding to the cryptographic index for possible multiple uses. As such, the IMweb server does not need to request the cryptographic information from the algorithm server each time, which simplifies the process.

After the encrypted data is decrypted, the IMweb server can process the data accordingly, such as performing local calculation, or sending UDP data package to backend server to get feedback data etc. After obtaining the processed data, the IMweb server may executes step 406 if the processed data needs to be returned to the browser.

In the instant messaging process, if the IMweb server has data that needs to be sent to the browser, Step 406 is further executed.

In step 406, the IMweb server sends a cryptographic information acquisition request to the algorithm server.

In step 407, the algorithm server obtains the cryptographic information including a cryptographic algorithm and a cryptographic index, and sends the cryptographic information to the IMweb server via intranet.

In step 408, the IMweb server uses the cryptographic algorithm in the cryptographic information to encrypt the data to be transmitted, and then sends the encrypted data and the cryptographic index in the cryptographic information to the browser through the HTTP channel.

In step 409, after the browser receives the encrypted data and the cryptographic index, the browser sends the cryptographic information acquisition request including cryptographic index to the HTTPS server.

In step 410, the HTTPS server receives the cryptographic information acquisition request including the cryptographic index, and sends the cryptographic information acquisition request to the algorithm server.

In step 411, the algorithm server obtains the cryptographic algorithm corresponding to the received cryptographic index, and sends it to the HTTPS server via intranet. The HTTPS server sends the cryptographic algorithm to the browser via the HTTPS channel.

In step 412, the browser uses the received cryptographic algorithm to decrypt the encrypted data sent from the IMweb server.

If, in Step 403, the browser has stored the cryptographic algorithm corresponding to the cryptographic index, the browser does not need to get the cryptographic algorithm from the HTTPS server again. The browser may directly decrypt the encrypted data using the previously stored cryptographic algorithm.

Steps 401-405 are the process of encryption and transmission for data sent by a browser to an IMweb server, while Steps 406-412 are the process of encryption and transmission for data sent by an IMweb server to a browser. Further, step 401 and step 406 can be executed without any particular order.

Figure 4:
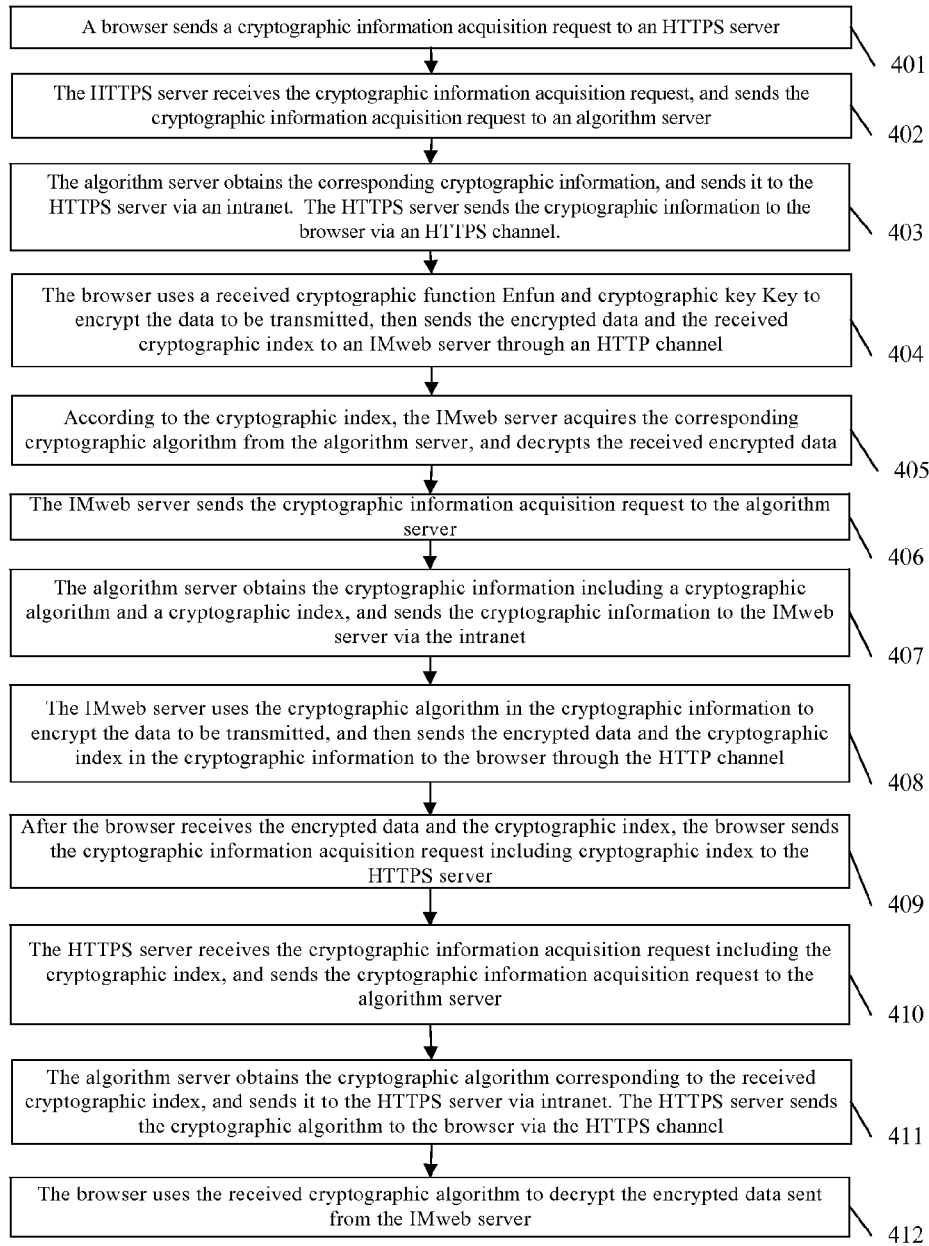
FIG. 4 shows an exemplary flow chart of a process for data encryption and decryption in data transmission through the web in accordance with the present invention.

After using the process shown in FIG. 4, even if the data transmitted between a browser and an IMweb server via the HTTP channel is captured by a package capture tool, the tool may be unable to get meaningful information because the tool has no knowledge of the cryptographic algorithm and cryptographic key.

The above examples are only several specific embodiments of the present invention, and are not used to limit the scope of this invention. Within the principles of the present invention, any changes, equivalent substitutions, improvements, etc., are still within the scope of the present invention.

The invention claimed is:

1. A method for encryption and decryption in data transmission through the web comprising:
   sending, by a browser, a cryptographic information acquisition request to a cryptographic information providing equipment;
   sending, by the cryptographic information providing equipment, the cryptographic information to the browser via an HTTPS channel, the cryptographic information including a cryptographic algorithm and a cryptographic index;
   encrypting, by the browser, data to be transmitted using the cryptographic algorithm, and sending the encrypted data and the cryptographic index to a web server via an HTTP channel; and
   based on the cryptographic index, obtaining, by the web server, a corresponding cryptographic algorithm from the cryptographic information providing equipment to decrypt the encrypted data;
   wherein sending, by the cryptographic information providing equipment, the cryptographic information to the browser via an HTTPS channel further includes:
      receiving the cryptographic information acquisition request by an HTTPS server within the cryptographic information providing equipment;
      sending, by the HTTPS server the cryptographic information acquisition request to an algorithm server within the cryptographic information providing equipment;
      obtaining, by the algorithm server, the corresponding cryptographic information;
      sending, by the algorithm server, the corresponding cryptographic information to the HTTPS server via an intranet; and
      sending by the cryptographic information to the browser by the HTTPS server through the HTTPS channel.

2. The method according to claim 1, wherein the cryptographic algorithm includes cryptographic functions and a cryptographic key;
   after the web server decrypts the encrypted data by the web server, the method also includes:
   deleting, by the web server, the cryptographic algorithm acquired from algorithm server.

3. The method according to claim 1, further including:
   providing real-time cryptographic information updates to the algorithm server by the cryptographic information providing equipment.

4. The method according to claim 1, wherein:
   the cryptographic information acquisition request includes a domain name,
   the algorithm server obtaining the corresponding cryptographic information and sending the corresponding cryptographic information to the HTTPS server via an intranet includes:
   obtaining, by the algorithm server, the corresponding cryptographic information corresponding to the domain name; and
   sending the cryptographic information corresponding to the HTTPS server through the intranet.

5. A method for data encryption and decryption in data transmission through the web, comprising:
   sending, by a web server, a cryptographic information acquisition request to a cryptographic information providing equipment;
   obtaining, by the cryptographic information providing equipment, the cryptographic information including a cryptographic algorithm and a cryptographic index;

sending, by the cryptographic information providing equipment, the cryptographic information to the web server;

encrypting, by the web server and using the cryptographic algorithm within the cryptographic information, the data to be transmitted;

sending, by the web server, the encrypted data and the cryptographic index within the cryptographic information to the browser through the HTTP channel; and obtaining, by the browser, from the cryptographic information providing equipment, the cryptographic algorithm corresponding to the cryptographic index sent from the web server, and decrypting the encrypted data sent from the web server;

wherein, sending, by the cryptographic information providing equipment, the cryptographic information to the web server further includes:

receiving the cryptographic information acquisition request by an HTTPS server within the cryptographic information providing equipment;

sending, by the HTTPS server the cryptographic information acquisition request to an algorithm server within the cryptographic information providing equipment;

obtaining, by the algorithm server, the corresponding cryptographic information;

sending, by the algorithm server, the corresponding cryptographic information to the HTTPS server via an intranet; and sending by the cryptographic information to the web server by the HTTPS server through the HTTPS channel.

6. The method according to claim 5, wherein the cryptographic algorithm includes cryptographic functions and a cryptographic key;

after the web server decrypts the encrypted data by the web server, the method also includes:

deleting, by the web server, the cryptographic algorithm acquired from algorithm server.

7. The method according to claim 5, further including:

providing real-time cryptographic information updates to the algorithm server by the cryptographic information providing equipment.

8. The method according to claim 5, wherein:

the cryptographic information acquisition request includes a domain name, the algorithm server obtaining the corresponding cryptographic information and sending the corresponding cryptographic information to the HTTPS server via an intranet includes:

obtaining, by the algorithm server, the corresponding cryptographic information corresponding to the domain name; and sending the cryptographic information corresponding to the HTTPS server through the intranet.

9. A cryptographic system for data encryption and decryption in data transmission through the web comprising a user terminal, a web server and a cryptographic information providing equipment, wherein:

the user terminal, based on a browser, is configured to send a cryptographic information acquisition request to the cryptographic information providing equipment;

the browser is configured to receive the cryptographic information including a cryptographic algorithm and a cryptographic index sent from the cryptographic information providing equipment, to use the cryptographic algorithm to encrypt the data to be transmitted, and to send the encrypted data to the web server through the HTTP channel;

the web server is configured to receive encrypted data and the cryptographic index sent from the browser, to get the cryptographic algorithm from the cryptographic information providing equipment according to the cryptographic index inside the cryptographic information; and to decrypt the encrypted data; and the cryptographic information providing equipment is configured to receive the cryptographic information acquisition request sent from the browser, to send the cryptographic information to the browser via the HTTPS channel; and to provide the cryptographic algorithm corresponding to the cryptographic index according to the request from the web server;

wherein the web server is further configured to obtain the cryptographic information including a cryptographic algorithm and a cryptographic index from the cryptographic information providing equipment, to encrypt the data to be transmitted using the cryptographic algorithm included in the cryptographic information; and to send the encrypted data and the cryptographic index included in the cryptographic information to the browser via the HTTP channel; and wherein the user terminal, based on a browser, is configured to obtain from the cryptographic information providing equipment through the HTTPS channel the cryptographic algorithm corresponding to the cryptographic index sent from the web server; and to decrypt the encrypted data sent from the web server.

10. The system according to claim 9, wherein the cryptographic information providing equipment including an algorithm server and an HTTPS server;

the HTTPS server is configured to receive the cryptographic information acquisition request sent from the browser, to send the cryptographic information acquisition request to the algorithm server, to receive the cryptographic information feedback from algorithm server, and to send the cryptographic information to the browser via the HTTPS channel; and the algorithm server is used to receive the cryptographic information acquisition request from the HTTPS server, to obtain the corresponding cryptographic information, and to send the information back to HTTPS server via the intranet.

11. The system according to claim 10, wherein the cryptographic information providing equipment also includes an administration server used to provide real-time updates to the cryptographic information in the algorithm server.

* * * * *